United States Patent [19]

Isobe et al.

[11] Patent Number: 4,461,544
[45] Date of Patent: Jul. 24, 1984

[54] AUTOFOCUSING LENS MOUNTING

[75] Inventors: Takasi Isobe, Tokyo; Shigeru Kamata, Kanagawa, both of Japan

[73] Assignee: Canon Kabushiki Kaisha, Tokyo, Japan

[21] Appl. No.: 326,289

[22] Filed: Dec. 1, 1981

[30] Foreign Application Priority Data

Dec. 4, 1980 [JP] Japan .................. 55-171205
Dec. 10, 1980 [JP] Japan .................. 55-174091

[51] Int. Cl.³ .................. G02B 7/10; G02B 7/11; G02B 7/04; G03B 7/08
[52] U.S. Cl. .................. 350/429; 350/255; 250/201; 354/400; 354/195.1
[58] Field of Search .................. 350/429, 430, 255, 400, 350/195.1; 250/201; 354/25, 195, 197, 198

[56] References Cited

U.S. PATENT DOCUMENTS

| 4,083,056 | 4/1978 | Nakamura et al. | 250/201 |
| 4,083,057 | 4/1978 | Quinn | 350/429 |
| 4,107,520 | 8/1978 | Wilwerding | 250/201 |
| 4,157,217 | 6/1979 | Isoho | 354/25 P |
| 4,183,639 | 1/1980 | Suwa | 354/25 P |
| 4,191,460 | 3/1980 | Fujiki | 354/198 |
| 4,309,077 | 1/1982 | Tomori | 350/255 |

FOREIGN PATENT DOCUMENTS

| 20914 | 1/1981 | European Pat. Off. | 350/429 |
| 2820964 | 11/1979 | Fed. Rep. of Germany | 350/429 |

Primary Examiner—Jon W. Henry
Attorney, Agent, or Firm—Toren, McGeady and Stanger

[57] ABSTRACT

Axial movement of a focusing lens holder is controlled by an output signal of automatic distance measuring means for automatically finding the distance from the means to an object. A lens mounting is selectively operable either by the drive control of the focusing lens holder within the lens barrel by the output signal from the automatic distance measuring means or by the manual drive of the lens holder for visual and manual focusing.

11 Claims, 10 Drawing Figures

AUTOFOCUSING LENS MOUNTING

BACKGROUND OF THE INVENTION

1. Field of the Invention

This invention relates to mechanical mountings for objective lenses, and more particularly to a mounting mechanism for an objective lens with means rendering it possible to selectively effect visual and manual focusing and automatic focusing.

2. Description of the Prior Art

Recently the field of art of photographic optics has developed a technique for automatically focusing an optical lens system, and various types of automatic focusing apparatus have been proposed, part of which are actually put into practical use as incorporated in cameras. The presently available automatic focusing cameras are, however, restricted to use in a certain working range. For close objects to be photographed, there arises a problem that the focusing control mechanism cannot be operated with an acceptable level of accuracy. To attain the condition of best focus throughout the entire focusing range as the objective lens is axially moved as a whole or in part, therefore, it is required to provide a mechanism for selectively enabling the focusing control to be effected either automatically or manually.

The automatic focusing apparatus is formed either with a light sensitive transducer for producing an electrical signal representing the degree of image sharpness, and a signal processor for finding the object distance to which the focusing movement of the objective lens is adjusted, or so that while the objective lens is being moved, constantly varying electrical signals are processed and upon detection of the condition of sharp focus, the objective lens is arrested. Accordingly, the use of an automatic focusing apparatus of whatever type necessitates a battery as the electrical and mechanical energy source. When all energy of the battery has been used up, and when there is no new battery at hand, the autofocusing camera is no longer operable. It is, therefore, of great importance to provide a manual focusing control mechanism which is built into the mechanical mounting for the objective lens together with the automatic focusing control mechanism so that the focusing can be selectively carried out automatically or manually.

SUMMARY OF THE INVENTION

An object of the present invention is to provide a mechanical mounting for an objective lens having a focusing control mechanism selectively operable automatically or manually.

Another object of the present invention is to provide a mechanical mounting for an objective lens including an automatic focusing control member operated by a driving device based on the output signal from an in-focus detecting device to move all or part of the objective lens in a holder axially, wherein there is provided a manual focusing control member (in the form of a focusing ring) on the lens mounting, whereby when the focusing is automatic, the automatic control member solely undertakes the focusing operation, and when visual and manual focusing is selected, the manual control member solely undertakes the focusing operation, wherein to switch from manual to automatic focusing mode, the operator need only move the focusing ring to a locked position relative to the basic sleeve of the lens mounting.

Still another object of the present invention is to provide a mechanical mounting for a zoom lens having a focusing control mechanism selectively operable automatically or manually.

A further object of the present invention is to provide a mechanical mounting for a zoom lens, the zoom lens including first and second lens groups which contribute to a zooming action and one of which serves to effect focusing, with the focusing lens group being selectively operated automatically or manually.

To accomplish the objects, according to the present invention, the mechanical mounting for the two-component zoom lens is made to include with an automatic focusing control member responsive to the output power of an automatic focusing device and arranged to cooperate with a lens holding member containing the zoom and focusing lens group.

Another object of the present invention is to provide a mechanical mounting for a zoom lens having a focusing control mechanism selectively operable automatically or manually, wherein when in the automatic focusing mode, a manual focusing control member is made to remain stationary so as not to turn on the outer barrel of the lens mounting.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

A first embodiment of the present invention will be described by reference to FIGS. 1 to 3. Since it is required that an automatic focusing apparatus be provided with means for controlling the automatic drive for movement of a focusing lens holder, which automatic drive is in the form of an electric motor and a gear train or other suitable motion transmitting means, provision for this may be made either at the interior of the camera housing, or at the interior of the lens mounting and particularly in a mounting of the interchangeable type. The first embodiment will be described in connection with a device of the former type.

Figure 1:
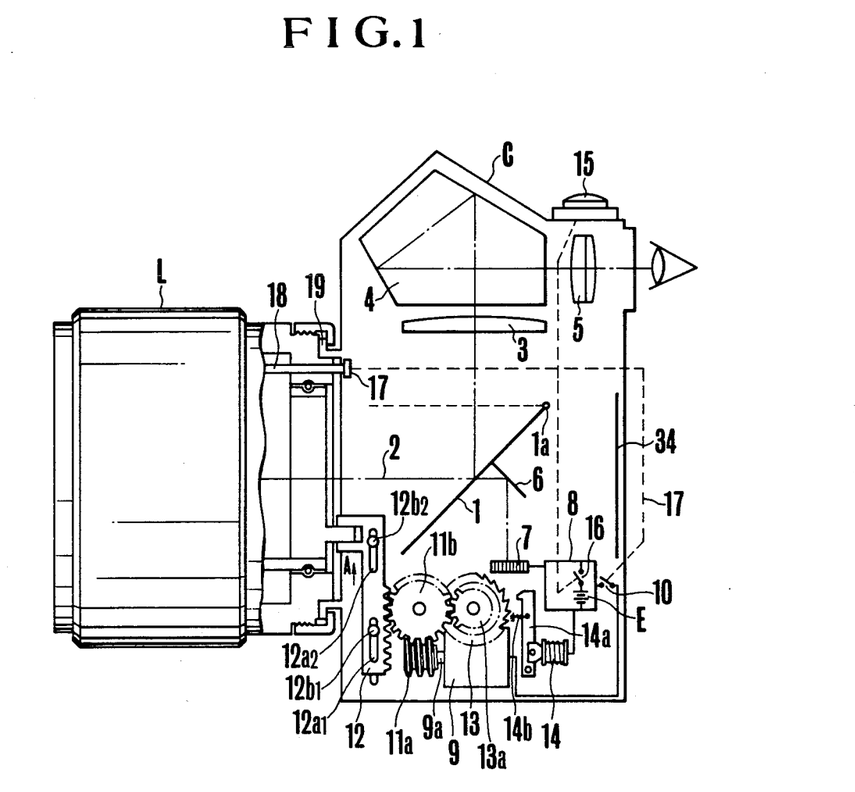
FIG. 1 is a schematic elevational view, partly in section, of a single lens reflex camera with a lens mounting of the invention.

FIG. 1 illustrates an arrangement of an image sharpness measuring device and a driving device the operation of which is controlled by the output of the image sharpness measuring device to adjust the position of an automatic focusing control member which lies within a lens mounting L.

In the drawing, the lens mounting L is illustrated as an interchangeable lens mounting releasably attached to the camera body C.

A half-permeable mirror 1 for directing light coming from an object to be photographed through an objective lens in the interchangeable lens L to a finder optical path is supported to be rotatable about a shaft 1a. The finder is known to those skilled in the art, and includes a condenser lens 3, a pentaprism 4 and an eye-piece 5. A sub-mirror 6 is supported on the back of the mirror 1 to direct part of the light transmitted through the mirror 1 to a line sensor 7 which is connected to an in-focus detecting circuit 8. An image of an object to be photographed is formed on the line sensor 7 which comprises a great number of charge storage type, or charge storage and discharge type photo sensor elements. The outputs of the individual photo sensor elements are read in timed sequential manner so that the object image is electrically scanned, and then processed by the in-focus detecting circuit 8. It is also possible to to use instead other suitable types of focus detecting devices known in the art.

A reversible motor 9 is connected to an electrical power source or battery E through a first power supply control switch 10. Motion of the motor 9 is transmitted from an output shaft 9a through a gear train 11a and 11b to a drive member 12. The drive member 12 is in the form of a slide having two elongated slots 12a1 and 12a2 through which guide pins 12b1 and 12b2 extend respectively.

A ratchet wheel 13 has a gear 13a meshing with the gear 11b and cooperates with a movable pawl 14a of an electromagnetic means 14 of which the period of actuation is controlled by a signal from the in-focus detecting device 8.

A release button 15 on the upper panel of the camera housing when pushed down closes a switch 16 whereby the detecting device 8, drive means 9 and electromagnetic means 14 are supplied with current. A signal pin 17 controlling the ON and OFF operation of the first current supply control switch 10 is arranged to project outwardly of, or retract into the front panel of the camera housing in contact with a selector pin 18 when a manual focusing control member, for example, a distance adjusting ring, rotatably fitted on an outer barrel of the lens mounting is placed out of, or in registry with an index labelled AF representing "automatic focusing" respectively. The selector pin 18 is arranged to project outwardly of the lens mounting L toward the camera body C and to retract therefrom when the manual focusing control member 20 is in the manual or automatic focusing positions respectively.

Figure 2:
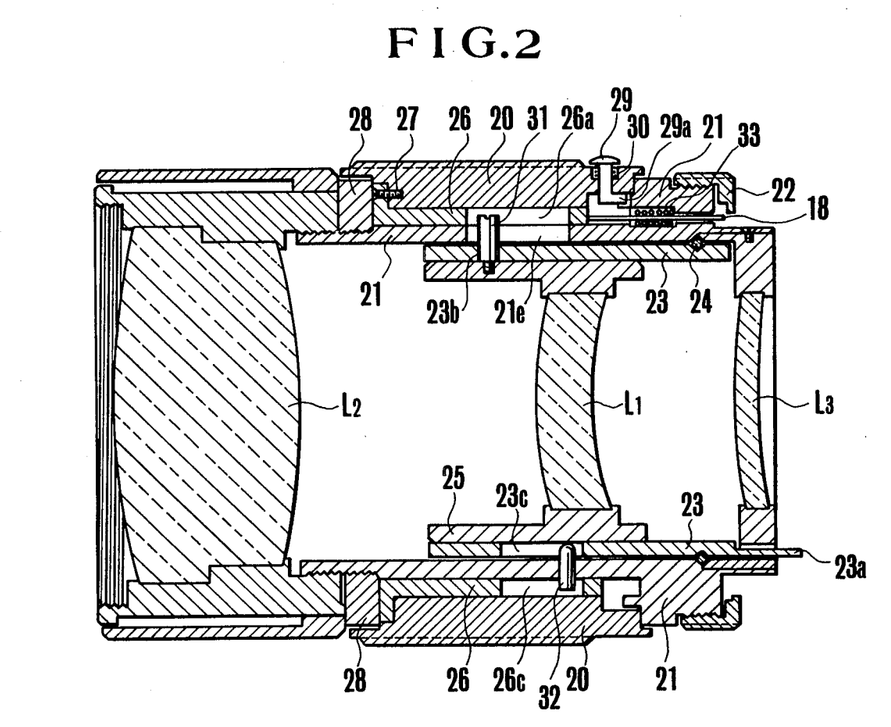
FIGS. 2 and 3 illustrate a first embodiment of the present invention applied to an interchangeable lens mounting, FIG. 2 being a longitudinal sectional view, and FIG. 3 being a fragmentary exploded perspective view of the main parts of the mounting.
Figure 3:
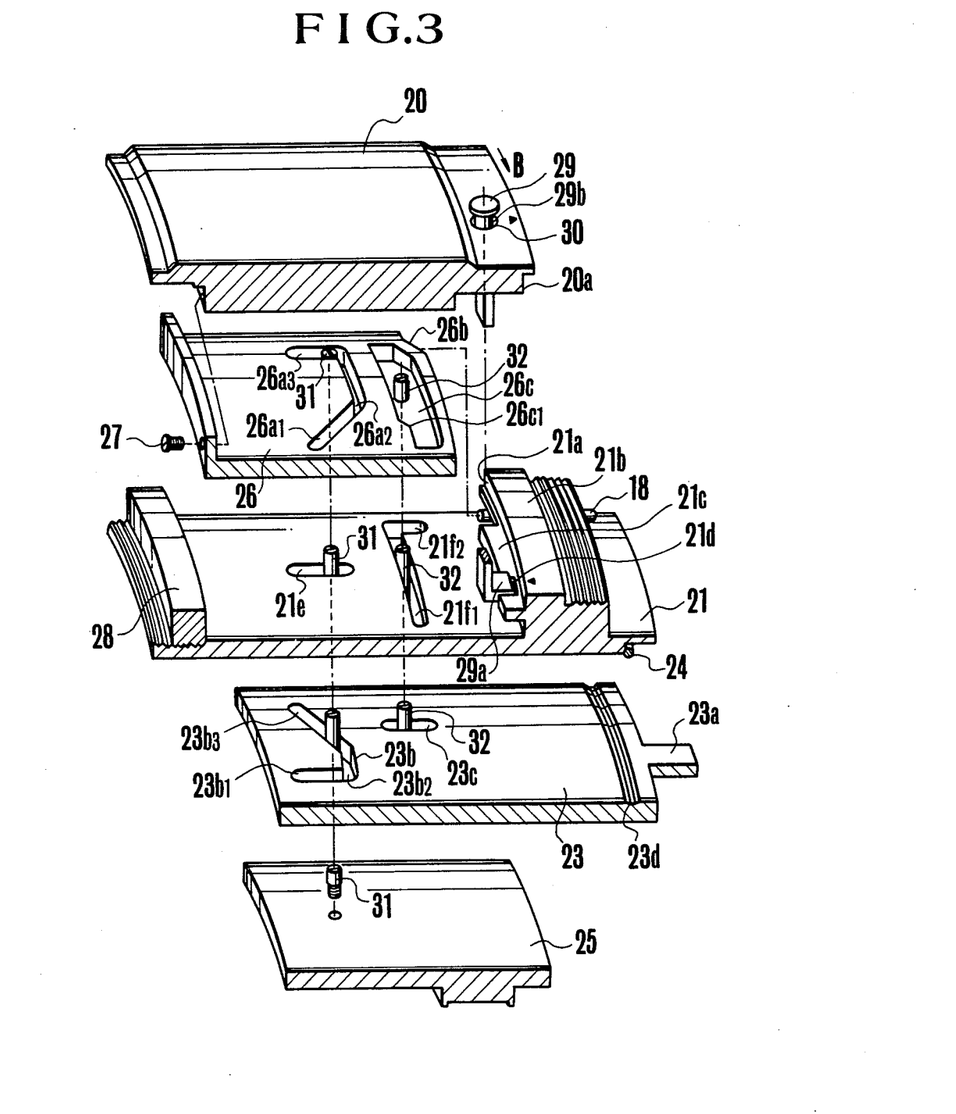

FIGS. 2 and 3 illustrates the details of the internal structure of the lens mounting L of FIG. 1 with the manual focusing control member 20 set in a locked position for the automatic focusing mode.

The lens mounting L includes a tubular body 21 with its rear end carrying a coupling means, for example, a bayonet mount ring 22 for attachment to the camera body C at a mount ring 19 thereof (see FIG. 1).

An automatic focusing control member 23 in the form of an inner sleeve is rotatably fitted in the inner diameter of the tubular body 21 through ball bearings 24 to provide smooth rotative movement and it is arranged to turn about a lens axis with its arm 23a rearwardly extending into a recess 12a of the drive member or slide 12. A lens holder 25 containing a focusing member L1 is movably fitted in the inner diameter of the automatic focusing control member or sleeve 23.

An intermediate member 26 for bringing the control member 23 and the lens holder 25 into and taking them out of operative connection with each other depending upon the selection of the automatic or manual focusing modes by the manual focusing control member 20 is in the form of an outer sleeve rotatably fitted on the outer diameter of the tubular body 21. This sleeve 26 is fixedly secured to the manual focusing control member 20 by screw fasteners 27.

The intermediate member or outer sleeve 26 is restrained from axial movement by a retainer ring 28 in cooperation with an abutment 21a against which the rear end (as viewed from the camera) of the manual focusing control member 20 is pressed.

A lock member 29 is provided for maintaining the manual focusing control member 20 stationary during automatic focusing. This lock member is configured in an "L" shape, of which the down stroke passes through a radial hole 20b in the member 20 and the foot 29a turns toward the rear. A coil spring 30 urges the lock member 29 in a radially outward direction. Cut on the outer periphery 21b contiguous to the abutment 21a is a focusing scale (not shown) beyond which is an index mark AF representing "automatic focusing".

The foot 29a of the lock member 29 is normally positioned in abutting engagement on the inner peripheral surface of a flanged portion 21c under the action of the spring 30. When the manual focusing control member 20 is turned to the AF position, the foot 29a enters a cutout 21d provided in the flanged portion 21c, whereby the manual focusing control member 20 is inhibited from rotative motion.

A cam follower pin 31 radially extends from the lens holder 25 through a slot 23b provided through the wall of the automatic focusing control member 23 into a longitudinally elongated slot 21e provided through the wall of the tubular body 21 and further therefrom into a slot 26a provided in the intermediate member 26. The slot 23b comprises an axially elongated portion 23b1, a traversely elongated portion 23b2 and a helically elongated portion 23b3, these portions being contiguous to each other as illustrated in FIG. 3. The third slot 26a comprises a helically elongated portion 26a1, a traversely elongated portion 26a2 and an axially elongated portion 26a3, these portions being contiguous to each other as illustrated in FIG. 3.

A mode selection control pin 32 is provided for maintaining the automatic focusing control member 23 inoperative when the manual focusing control member 20 is positioned out of registry with the index mark AF to read the focusing scale. This pin 32 is fitted in another slot 21f in the tubular body 21 and further in another slot 23c in the automatic focusing control member 23, and projects into a cutout 26c. It is noted that though the thus-constructed lens mounting L has been described as using the intermediate member 26 of separate form from the manual focusing control member 20, equivalent parts to the slot 26a and cutout 26c and a tapered portion 26b may be formed in the inner surface of the manual focusing control member 20. If so, the intermediate member 26 can be omitted.

The operation of the camera with the lens mounting of FIGS. 1 to 3 is as follows:

When the manual focusing control member 20 is turned to place its triangular index mark in registry with the similar index mark labelled AF on the tubular body 21, or when the automatic focusing mode is selected and set, the tapered portion 26b of intermediate member 26 causes the actuator pin 18 to retract from the camera body under the action of a spring 33 which in turn causes the signal pin 17 to close the first power supply control switch 10 in the camera housing. After the camera has been aimed at an object to be photographed, when the release button 15 is depressed, the second power supply control switch 16 is closed to energize the image sharpness detecting device 7, 8, the electromagnet means 14 and driving means or motor 9. Since the electromagnet means 14 is energized, the movable pawl 14a is attracted to disengage from the ratchet wheel 13 against the force of the spring 14b. In this state, where light 2 emerging from the objective lens L is partly split off by the half-mirror 1 to the sub-mirror 6 and then reflected therefrom to the line sensor 7, the in-focus detecting device 8 starts to process the signal from the line sensor 7. Also since the motor 9 is energized, motion of the motor 9 is transmitted through the gear train 11a and 11b to move the drive member 12 in a direction indicated by arrow A, while the automatic focusing control sleeve 23 because of its operative connection with the drive member 12 is driven to turn about the lens axis. This rotative movement of the member 23 is transmitted to axial movement of the lens holder 25 by the cam mechanism comprising the helical slot 23b3, cam follower pin 31 and axial slot 21e, since the cam follower pin 31 is located in the axial slot 26a3 of the intermediate member 26. As this lens holder 25 moves from an initial position for an infinitely distant object to suit nearer object distances, the line sensor 7 produces output signals representing everchanging degrees of sharpness of an image of the object in sequence. Then when the focusing lens member L1 has reached a position where the object image is in sharpest focus on a film plane (not shown), as is sensed by the in-focus detecting device 8, the duration of energization of the electromagnetic means 14 is terminated, permitting the pawl 14a to arrest the ratchet wheel 13 under the action of the spring 14b. Thus, the automatic focusing control member 23 is stopped from further movement. With this focus setting left unchanged, the mirror 1 is then flipped upwards, which is then followed by actuation of a shutter (not shown) and a diaphragm (not shown) to initiate an exposure operation.

When one cycle beginning with the actuation of the release button 15, proceeding through the operation of the automatic in-focus detecting circuit and adjustment in position of the focusing lens member in the lens mounting, and terminating at the operation of the exposure control circuit has been completed, the automatic focusing control member 23 is automatically returned to the initial position. For this purpose, use may be made of a motor-reversing control circuit (not shown) arranged to be actuated when a trailing curtain 34 of the shutter runs down and connected to the driving means or motor 9, so that the running down movement of the trailing curtain of the shutter is automatically followed by an actuation of the motor 9 for reversed rotation, causing the drive member 12 to move in the reversed direction to that indicated by arrow A and therefore causing the automatic focusing control member 23 to return to the initial position.

Next an explanation is given regarding change from automatic to the manual focusing mode and also to the visual and manual focusing.

When it is desired to switch the camera from the automatic focusing mode described in connection with FIGS. 2 and 3 to the manual focusing mode, the photographer first pushes the lock member 29 inwards against the force of the spring 30, whereby the foot 29a is moved away from the detent slot 21d of the flanged portion 21c, thus rendering the manual focusing control member 20 rotatable. Then, the photographer while pushing the lock member 29 turns the manual focusing control member 20 in the opposite direction to that indicated by arrow B by a certain angular distance to a position where the lock member 29 may be released from the pressure applied thereon by the photographer, and where the mode selection control pin 32 is displaced from the traversely elongated slot 21f1 to the axially elongated slot 21f2 by the tapered surface 26c1 of the intermediate member 26. The cam follower pin 21 then lies at the transit point from the traversely to the helically elongated slot 26a1 and from the traversely to the axially elongated slot 23b1. Further rotative movement of the manual focusing control member 20 is transmitted to axial movement of the lens holder 25 by the second cam mechanism comprising the helical cam slot 26a1, cam follower pin 31 and axial slot 21e. It is noted that when in the manual focusing mode, the automatic focusing control member 23 is restrained from rotation by the pin 32 lying in the axial slot 21f2 of the tubular body 21, and that the length of the axial slot 23b1 is pre-adjusted so as to absorb the total movement of the focusing lens member L1.

The actuator pin 18 is projected toward the camera body C by the tapered surface 26b of the intermediate member 26 which in turn causes the signal pin 17 to open the switch 10 in the camera housing, whereby the automatic focusing apparatus is cut off from the battery E. It is noted that this switch 10 may be otherwise arranged to be accessible from the outside of the camera housing, while the actuator pin 18 therefor is excluded.

Figure 4:
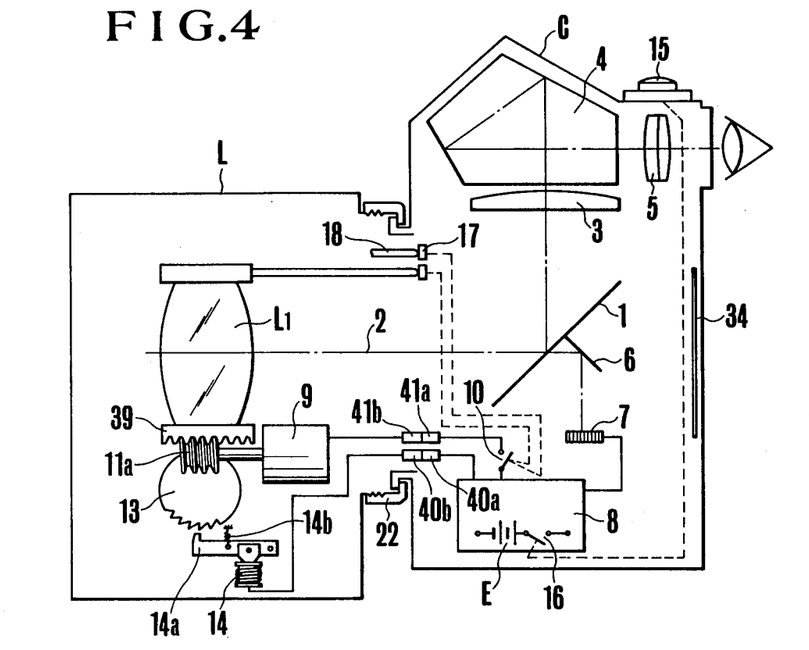
FIG. 4 is a schematic sectional view illustrating another example of an arrangement of the driving system for the automatic focusing mechanism in the interior of the lens mounting.

FIG. 4 illustrates another example of an arrangement of the automatic focusing apparatus particularly with the driving mechanism for the lens holder incorporated into the lens mounting, where the same reference characters have been employed to denote similar parts to those illustrated in FIGS. 1 to 3. In this example, the drive source or motor 9, gear 11a, ratchet wheel 13 and electromagnetic means 14 are arranged in the lens mounting L, while the in-focus detecting device 8 is left in the camera housing C, and two channels for electrical power supply and electrical signal transmission from the battery E and device 8 to the motor 9 and solenoid 14 are formed by interconnection terminals 40a and 40b, and 41a and 41b.

Figure 5:
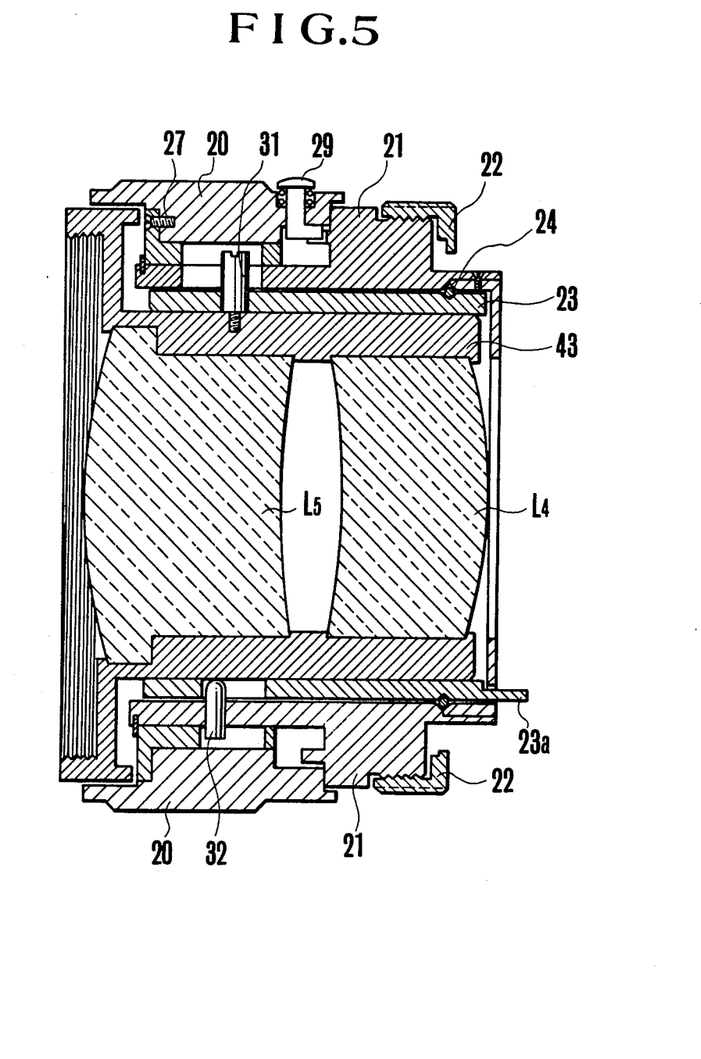
FIG. 5 is a longitudinal sectional view illustrating another example of application of the present invention to a mechanical mounting for an objective lens bodily movable for focusing.

The lens mounting of FIG. 4 has substantially the same construction as that illustrated in FIGS. 2 and 3, and is only different from the latter in that all of the mechanical parts of the automatic focusing apparatus are built into the mechanical mounting for the objective lens. While the mechanical mounting of FIGS. 2 and 3 is adapted to be used in an assembly including the lens components L1, L2 and L3 constituting an objective lens system, wherein only one lens component L1 is movable for focusing, the present invention is applicable to a bodily movable objective lens system for focusing with a slight modification of the mounting mechanism as illustrated in FIG. 5. That is, as the objective lens system of FIG. 5 comprises two components L5 and L4, both of the lens components L4 and L5 are mounted in a common holder 43 similar in arrangement to the holder 25 of FIGS. 2 and 3.

Figure 6:
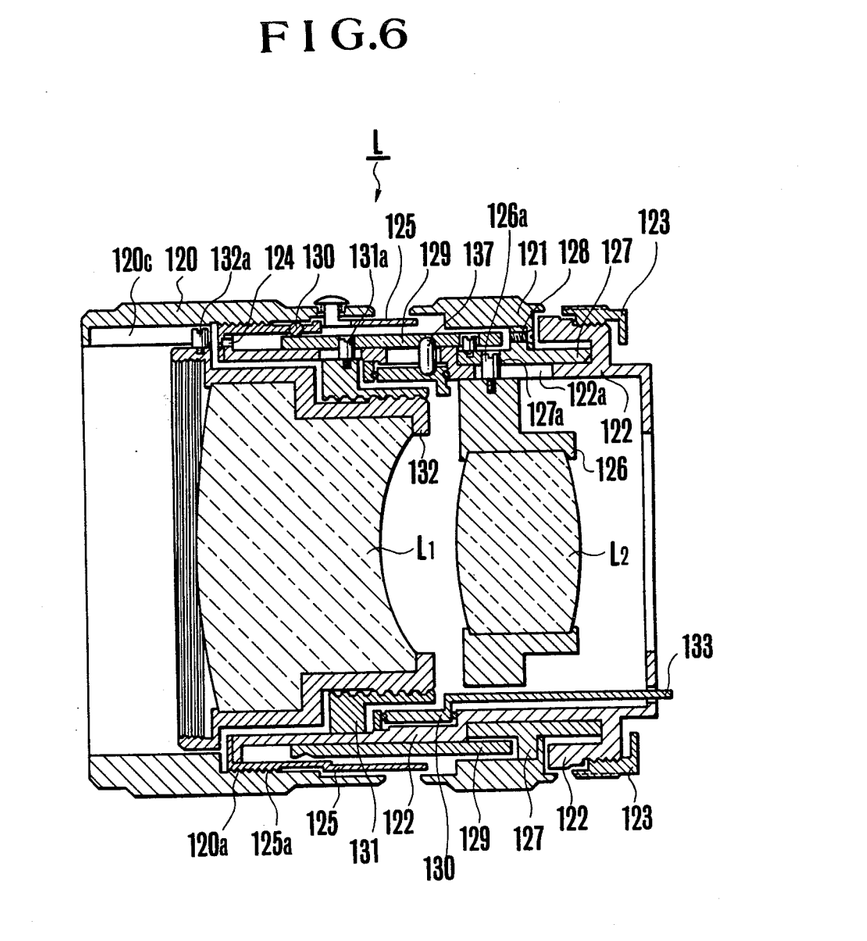
FIGS. 6 and 7 illustrate a second embodiment of the present invention applied to a zoom lens mounting, FIG. 6 being a longitudinal sectional view and FIG. 7 being a fragmentary exploded perspective view of the main parts of the mounting.
Figure 7:
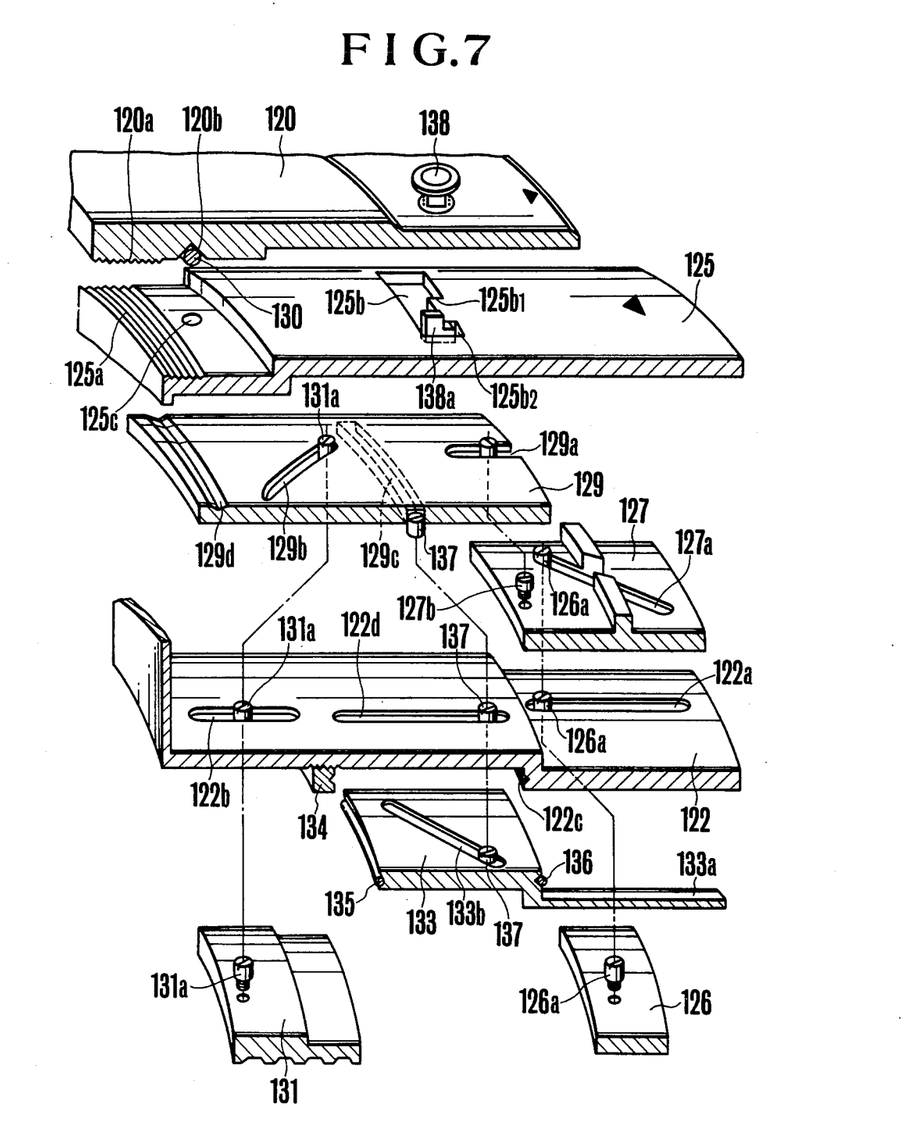

Another embodiment of the present invention is next described particularly in connection with an example of application thereof to zoom lens mountings by reference to FIGS. 6 and 7. In the drawings, a mechanical mounting for a zoom lens optical system comprising two components L1 and L2 has a manual focusing control member 120 by which the first or front lens component L1 is axially moved to effect manual focusing, and a zoom control member 121 which, as it turns about a lens axis, causes the first and second lens components L1 and L2 to be moved axially but in differential relation to each other to perform the image magnification varying function and the image shift compensating function.

A body tube (fixed barrel) 122 has a bayonet mount ring, screw-threaded mount ring, or other suitable coupling means 123 for releasable attachment to a mount ring 119 on the camera housing. The body tube 122 fixedly carries what may be called a second body tube or auxiliary tube 125 by screw fasteners 124 at the front ends thereof. The manual focusing control member 120 is movably fitted on the auxiliary tube 125 at threaded portions 120a and 125a and also lockable to the latter. The zoom control member 121 is arranged so as to occupy a space defined by the front end of the body tube 122 and the rear end of the auxiliary tube 125 and is rotatable in a certain range of angular distances. Affixed to this zoom control member 121 is a second cam sleeve 127 contributing to control of axial movement of a second lens holder 126 containing the second lens component L2 by screw fasteners 128, so that when the zoom control member 121 turns, the second cam sleeve 127 also turns in unison therewith. A cam follower pin 126a radially extends from the second lens holder 126 through a first axially elongated slot 122a in the body tube 122 into a helically elongated slot 127a in the second cam sleeve 127. This pin-and-slot connection allows for the control of movement of the second lens holder 126.

A first cam sleeve 129 is arranged in a space between the body tube 122 and auxiliary tube 125 and is operatively connected to the second cam sleeve 127 by an axially elongated slot 129a engaging a pin 127b. Formed in the first cam sleeve 129 are a helically elongated slot 129b, an inner transversely elongated groove 129c and an outer circumferential groove 129d for a ball 130. The helically elongated slot 129b receives a cam follower pin 131a which radially extends from a helicoid ring 131 through a second axially elongated slot 122b in the body tube 122.

The helicoid ring 131 has an inner helicoid portion 131b threadedly engaging a first lens holder 132 containing the first lens component L1. The axial movement of the first lens component L1 is controlled by the cam mechanism comprising the helically elongated slot 129b, axially elongated slot 122b and cam follower pin 131a.

As automatic focusing control member 133 has a rear extension to be operatively connected with the drive member 12 of FIG. 1, and is rotatably supported in fitted relation between the front inner shoulder 122c of the stepped down portion of the body tube 122 and a retainer ring 134 through ball bearings 135 and 136 in respective "V" shaped grooves thereof.

A cam follow pin 137 radially stands in a bottom-closed helical slot 133b so as to project through a third axially elongated slot 122d of the body tube 122 and engage in the inner transversely elongated groove 129c of the first cam sleeve.

This cam mechanism comprising the pin 137, helical groove 133b, axial slot 122d and traverse groove 129c transmits rotative movement of the automatic focusing control member 133 to axial movement of the first lens holder 132 when in the automatic focusing mode.

A locking member 138 is provided for locking the manual focusing control member to the auxiliary tube 125, with its rod passing through a hole 120b in the manual focusing control member 120 and a hole 125b in the auxiliary tube and with its bottom end being bent to form a foot 138a engageable in a detent recess 125b1 in an opening of the auxiliary tube. A coil spring 139 urges the locking member 138 in an upward (outward) direction. The ball 130 snugly lying in the penetration hole of the auxiliary tube 125 functions as a means for allowing the first cam sleeve to be axially moved when in the automatic focusing mode and preventing it from being axially moved when in the manual focusing mode.

The operation of the zoom lens mounting of FIGS. 6 and 7 is as follows: With the lens mounting L attached to the camera body C of FIG. 1, to select the automatic focusing mode, the photographer turns the manual focusing control member 120 to place its triangular index mark in registry with an index mark formed as an opposed triangle on the auxiliary tube 125. thus, the automatic focusing mode is set. During this selecting operation, the photographer needs to continue pushing the locking member 138 at its head until the automatic focusing position is reached, as the foot 138a slidingly moves on the inner surface of a flanged portion 125b1. At that position, when the photographer removes his finger from depressing the locking member 138, the foot 138a enters the detent recess 125b2, whereby the manual focusing control member 120 is locked.

After the camera has been aimed at an object to be photographed, when the release button 15 of FIG. 1 is pushed down, the current supply control switches 10 and 16 are closed to render the in-focus detecting device 8 operative and energize the driving means 9. Since the electromagnetic means 14 is also energized, the pawl lever 14a is turned against the force of the spring 14b to disengage from the ratchet wheel 13. In this state, while light emerging from the zoom lens L is split off by the half-mirror 1 to the sub-mirror 6 and therefrom reflected to the sensor 7, the in-focus detecting device starts to operate to determine the object distance.

Since the motor 9 is energized, motion of the motor 9 is transmitted through the gear train 11a and 11b to move the drive member 12 in the direction indicated by arrow A. Then, the automatic focusing control sleeve 133 is driven by the drive member 12 to turn about the lens axis. Such rotative movement of the sleeve 133 is transmitted to axial movement of the first cam sleeve 129 by the cam mechanism comprising the pin 137, axial slot 122d and traverse slot 129c, while the second cam sleeve is left to remain stationary by the use of the means comprising the axially elongated slot 129a and pin 127b. The ball 130 journally held in the penetration hole 125c of the auxiliary tube 125 is retracted into the groove 120b provided in the inner surface of the manual focusing control member 120 by the movement of the first cam member 129. Such axial movement of the first cam sleeve 129 causes the helicoid ring 131 and first lens holder 132 to move linearly in the axial direction by the drive connection comprising the pin 131a, axial slot 122b and helical slot 129b. When the first lens component L1 has reached a position where the condition of sharpest focus is detected by the device 8, the electromagnetic means 14 and motor 9 are de-energized, whereby the drive member 12 is arrested by the pawl 14a, and the lens L is held stationary in the adjusted focusing position.

To switch from the automatic to the manual focusing mode, the photographer while pushing the locking member 138 at its head turns the manual focusing control member about the lens axis, as the foot 138a is disengaged from the detent recess 125b2. A drive connection comprising an inner axially elongated groove 120c in the focusing control member 120 and a pin 132a which is radially fixed in the outer surface of the first lens holder 132 so as to project into the groove 120c translates rotative movement of the manual focusing control member 120 to rotative movement of the first lens holder 132 which is simultaneously reflected to axially move itself by the lead of the helicoid 131b. During this manual focusing operation, the first cam sleeve is restrained from axial movement by the ball 130 dropping into the groove 129d and seating at the interface between the first cam sleeve 129 and the auxiliary tube 125.

In order to perform zooming operation, with the first lens component L1 already adjusted in position to effect sharpest focusing in either the automatic or the manual focusing mode, when the zoom control member 121 is turned about the lens axis, the first and second cam sleeves 127 and 129 turn in unison. Such rotative movement of the first and second cam sleeves 127 and 129 is transmitted to differential axial movement of the first and second lens holders 132 and 126 by the cam mechanism of the pin 131a, axial slot 122b and helical slot 129b, and the second cam mechanism of the pin 126a, axial slot 122a and helical slot 127a respectively. The axial separation between the first and second lens component L1 and L2 at a station is dependent upon the corresponding lead between the helical slots 129b and 127a, thus changing the image magnification while compensating the image shift.

It is noted that during this zooming operation, the second cam sleeve 129 turns about the lens axis, but this does not induce a drive on the manual focusing control member 120 because of the use of the ball 130 arranged between the second cam sleeve 129 and the manual focusing control member 120 through a hole in the auxiliary tube 125.

Figure 8:
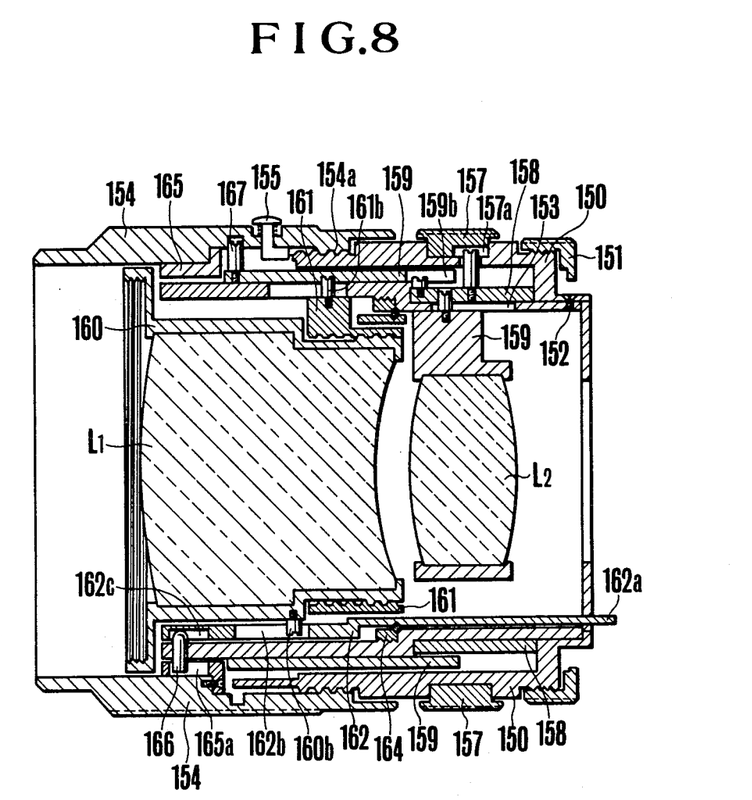
FIGS. 8 and 9 illustrate an example of a modification of the mechanical mounting of FIGS. 6 and 7, FIG. 8 being a longitudinal sectional view and FIG. 9 being a fragmentary exploded perspective view of the main parts of the mounting.
Figure 9:
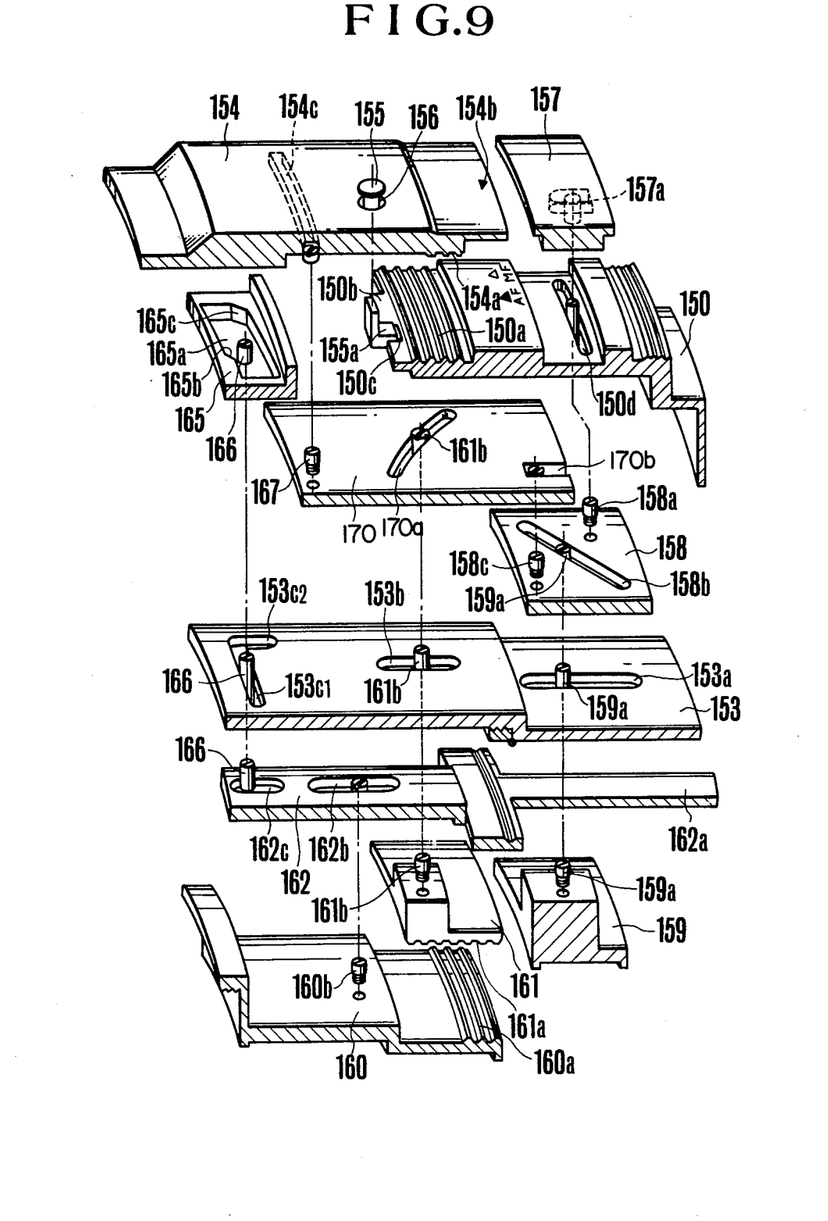

FIGS. 8 and 9 illustrate a fourth embodiment of the present invention, wherein the zoom lens optical system comprises two lens components L1 and L2 of which the first counting from the front is axially movable for focusing, and the focusing is performed by translating the rotative movement of the lens component L1 to axial movement thereof when in the automatic mode, and by moving the lens component L1 axially without involving any rotative movement thereof when in the manual mode.

A body tube 150 has a coupling means 151 for releasable attachment to the camera body of FIG. 1. Affixed to the body tube 150 by screw fasteners 152 is an auxiliary tube 153 on which is fitted a manual focusing control member 154 in helicoid-threaded relation by mating helicoid portions 150a and 154a thereof. A locking member 155 is provided for locking the manual focusing control member 154 to the body tube 150 when in the automatic focusing mode with its foot 155a arranged to engage in a detent recess 150c of a flanged portion 150b of the body tube 150. A spring 156 urges the lock member 155 in the outward direction. A zoom control member 157 is fitted in a recess of the body tube 150. A second cam sleeve 158 controls movement of the 2nd lens component L2. A dowel pin 158a is fixed radially in the outer surface of the second cam sleeve 158 so as to project through a transversely elongated slot 150d in the body tube 150 and engage in an axial groove 157a formed in the inner peripheral surface of the zoom control member 157. Therefore, when the zoom control member 157 is turned about an optical axis, the second cam sleeve 158 too is also turned therewith. Rotative movement of the second cam sleeve 158 is transmitted to axial movement of a lens holder 159 for the second lens component L2 by a cam mechanism comprising a helically elongated slot 158b in the second cam sleeve 158 and a cam follower pin 159a radially extending from the lens holder 159 through an axially elongated slot 153a in the auxiliary body tube 153 into the slot 158b. A first cam sleeve 170 controls axial movement of a lens holder 160 for the first lens component L1. That is, the lens holder 160 threadedly engages a helicoid member 161 at helicoid portions 160a and 161a. A cam follower pin 161b is fixed radially on the outer surface of the helicoid member 161 so as to project through a second axially elongated slot 153b in the auxiliary body tube and engage in a helically elongated slot 159a in the first cam sleeve 170. This pin-and-slot connection cooperates with engaging means of a pin 158c radially extending from the second cam sleeve 158 into an axial slot 170b in the first cam sleeve to move the first lens component L1 according to the lead amount of the helical slot 170a.

An automatic focusing control member 162 is rotatably fitted in the inner diameter of the auxiliary body tube 153 by a ball bearing 163 and a positioning collar 164 and has an arm 162a rearwardly axially extending to engage with the drive member 12 in the camera housing of FIG. 1.

A dowel pin 160b radially extends from the first lens holder 160 into an axially elongated slot 162b in the automatic focusing control member 162 so that the automatic focusing control member 162 and the first lens holder 160 turn in unison with each other, while the first lens holder 160 is simultaneously moved axially.

Means is provided between the automatic and manual focusing control members 162 and 154 for switching the automatic focusing control member 162 between a rotatable position and a position restrained from rotation depending upon the selection of the manual and automatic focusing modes. That is, this means comprises an actuator sleeve 165 fitted in the inner diameter of the manual focusing control member 154 in fixedly secured relation by screw fasteners and a control pin 166 movably fitted in a slot 153c in the auxiliary body tube 153 and an axial slot 162c in the automatic focusing control member 162 and projecting into an opening in the actuator sleeve 165.

The operation of the mechanical mounting of FIGS. 8 and 9 is as follows:

When it is desired to select the automatic focusing mode, the operator while pushing the locking member 155 at its head will turn the manual focusing control member 154 about the optical axis to place its index mark 154b in registry with an index mark labelled AF on the body tube 150, whereby the foot 155a is aligned to the detent recess 150c. When the operator releases the lock member 155, the manual focusing control member 150 is locked in the AF position. During this selecting operation, the actuator sleeve 165 moves the selection control pin 166 into the traversely elongated slot 153c1 in the auxiliary body tube 153, whereby the automatic focusing control member 162 is rendered rotatable about the optical axis.

Then, when a camera release is actuated, the automatic focusing control member 162 is driven to turn about the optical axis. The drive connection of the pin 160b in the slot 162b turns the first lens holder 160 which in turn is axially moved by the engagement with the helicoid 161 until the condition of sharp focus is achieved.

When it is desired to switch from the automatic to the manual focusing mode, the operator, while pushing the lock member 155, rotates the manual focusing control member 154 in the direction tword the manual focusing indication MF on the outer circumference of the body tube 150. Such movement of the member 154 causes the actuator sleeve 165 to move the pin 166 from the transverse to the axial slot 153c2 in the auxiliary body tube 153 as the pin 166 is pushed by the tapered surface 165b of the opening 165a in the actuator sleeve 165 (manual focusing position). After that, further rotative movement of the manual focusing control member 154 effects axial movement thereof by the engagement of the mating helicoids 150a and 154a relative to the body tube 150. Since the manual focusing control member 154 is operatively connected to the first cam sleeve 170 by the pin 167 in the transverse groove 154c, as the manual focusing control member 154 moves axially, the first cam member 159 is also moved axially. As this first cam sleeve 170 moves, the engaging means of the pin 161b, and slots 153b and 159a move the helicoid member 161 axially. Thus, the visual and manual focusing of the first lens group L1 is effected.

When it is desired to select the automatic focusing mode again switched from the manual focusing mode, the manual focusing control member 154 is turned to the AF position, whereby the selection control pin 166 is transposed from the axial to the transverse slot 153c1 by the tapered surface 165c of the opening 165a of the actuator member 165. Thus, the automatic focusing control member 162 is rendered rotatable again in the mounting mechanism.

The zooming operation is performed by turning the zoom control member 157 about the optical axis. Then, the drive connection of the pin 158a in the slot 157a causes the second cam sleeve 158 to turn, which in turn causes the second drive connection of the pin 158c in the slot 159b to turn the first cam sleeve 159. Such rotative movement of the first and second cam sleeves 159 and 158 in unison is transmitted to differential axial movement of the first and second lens holders 160 and 159 by the first cam mechanism of pin 161b, axial slot 153a and helical slot 158b and the second cam mechanism of pin 159a, axial slot 153a and helical slot 158b respectively, so that magnification of the object image is changed with image shift compensation being effected.

It will be appreciated that the present invention provides a mechanical mounting for an objective lens system having an automatic focusing control member which is moved with the supply of driving power from the associated camera body and of which the position is adjusted in accordance with an actuating signal from an image sharpness measuring device. Furthermore, there is provided a manual focusing control member on the mechanical mounting which also serves as a focusing mode selector, whereby when the manual focusing control member is set in the automatic focusing position, the driving power and actuating signal are allowed to control the focusing operation of the objective lens in the mechanical mounting therefor. When the manual focusing control member is moved away from the automatic focusing position, the automatic focusing control member is restrained from rotative movement, or inhibited from actuation, permitting the manual focusing control member to solely undertake visual and manual focusing. As has been described in connection with the objects of the present invention, the camera can be operated with suitable selection of the automatic and manual focusing modes depending upon how distant the object is and what lighting situation is encountered.

Another advantage arising from the use of the lock member in the manual focusing control member is that when automatic focusing is being performed, since the photographer is liable to attempt also to control the focusing ring, this can be prevented, and the constraint of the focusing ring with the camera body makes easier holding of the camera with the lens.

Still another advantage is that since, according to the invention, the automatic focusing control member is driven for movement in one direction by the motorized gear mechanism, premature consumption of electrical energy of the battery can be prevented. In more detail, when the driving means is associated with a bias means, for example, a spring, as this spring functions to return the automatic focus control member to the initial position, the load on the motor increases with increase in the required electrical energy.

A further great advantage arising from the provision of the automatic and manual focusing modes is that, for example, in a case where the available light is so inadequate that the accuracy of automatic focusing control cannot be insured, and, therefore, the photographer must have artificial light such as stroboscopic light to take a picture, since the selection of the automatic focusing mode might lead to loss of a photographic opportunity because of insufficient object brightness information, the photographer can switch the camera from the automatic to the manual focusing mode in which a flash exposure is then possible, thus covering a wider range of focusable photographic situations.

It will be further appreciated in connection with the zoom lens having two movable lens components L1 and L2 both contributing to zooming but one of which is used as a focusing component, that the present invention makes it possible to actuate the focusing component either manually or automatically. Therefore, even when light from an object to be photographed is so dim that the automatic focusing apparatus is difficult to work well, or when the electrical energy source has not been replenished yet, the camera can be operated in the manual focusing mode. Further with the camera set in the automatic focusing mode, those who because of being not accustomed to a focusing operation are apt to take blurred photographs are now able to shoot without suffering from troublesome focusing operation, while still permitting perfect photographs with good image sharpness to be taken.

Another feature of the invention is that particularly with a zoom lens having a component movable during zooming and also during focusing, that component is made operable automatically and manually to effect focusing. In application of the present invention, therefore, there is no need to construct the zoom lens optical system from a focusing component which remains stationary during zooming, and zooming components which remain stationary during focusing, thereby giving an additional advantage that the provision of selecting the automatic and manual focusing modes does not call for a large increase in the bulk and size as compared with the conventional mechanical mounting, and a compact mechanical mounting of reduced size with broadened capabilities can be realized. While specific embodiments of the invention have been shown and described in detail to illustrate the application of the inventive principles, it will be understood that the invention may be embodied otherwise without departing from such principles.

What is claimed is:

1. A mechanical mounting for an objective lens capable of automatic focusing control, comprising:
   (a) holding means for holding optical elements for focusing;
   (b) a rotary member rotating about an optical axis based on a signal from means for detecting the object distance, and being stopped from rotation based on a signal from said detecting means;
   (c) a fixed barrel having said rotary member fitted in one of the inner diameter and the outer diameter thereof; and
   (d) means for converting rotative movement of said rotary member to axial movement of said holding means, said converting means being comprised of one of a longitudinal and arcuate slot formed in said fixed barrel, one of an arcuate and longitudinal slot formed in said rotary member, and an engaging member fitted at a cross point of said slots and fixedly mounted on said holding means, thereby enabling focusing adjustment of said optical elements to be controlled by rotation of said rotary member.

2. A mechanical mounting according to claim 1 further comprising:
   (a) focusing operation means for manual focus operation of said holding means, said focusing operation means having an intermediate member arranged upon rotation of said focus operation means about the optical axis to axially move said holding means, and said intermediate member having a guide groove engaging with said engaging member and cooperating with said slot to control movement of said holding means.

3. A mechanical mounting according to claim 2 further comprising:
   (a) selection means for enabling selection of one of an automatic focusing mode and a manual focusing mode, said selection means having lock means for locking said focus operation means in a predetermined position, and means for selectively enabling and inhibiting rotation of said rotary member.

4. A mechanical mounting according to claim 3 wherein said means for selectively enabling and inhibiting rotation of said rotary member is provided with an engaging member engaging in one of a circumferential groove and a longitudinal groove formed in said fixed barrel and engaging with said rotary member; and changeover means for selectively changing over said engaging member between said intermediate member and said groove.

5. A mechanical mounting for an objective lens capable of selecting manual focusing and automatic focusing, comprising:
   (a) barrel means;
   (b) holding means for holding optical elements for focusing;
   (c) focusing operation means for controlling movement of said holding means by manual actuation;
   (d) a rotary member rotating about an optical axis based on a signal from means for detecting the object distance, said rotary member having a first guide portion extending in an axial direction and a second guide portion having an inclined angle;
   (e) means responsive to either rotative movement of said focusing operation means or movement of said rotary member for moving said holding means axially;
   (f) intermediate means provided in a single-unit form with said focusing operation means, or as an independent member, said intermediate means having a first guide portion extending in an axial direction and a second guide portion extending at an inclination angle;
   (g) an engagement member fixedly secured to said holding means, said engagement member engaging in the cross point of said individual guide portions of said rotary member and said intermediate means;
   (h) changeover means for changing the engaging relation of said engagement member and said individual guide portions depending upon the selection of whether said holding means is moved by said rotary member or by said focusing operating means; and
   (i) lock means for locking said focusing operation means in a predetermined position when said holding means is moved to an in-focus position based on a signal from said detecting means.

6. A mechanical mounting for an objective lens capable of automatic focusing control, comprising:
   (a) holding means holding optical elements for focusing;
   (b) barrel means;
   (c) focusing operation means for moving said holding means to an in-focus position by manual operation;
   (d) a rotary member rotatable about an optical axis based on a signal from means for detecting the object distance,
   (e) moving means for moving said holding means to an in-focus position by actuating said focusing operating means, or for moving said holding means axially by rotation of said rotary member;
   (f) intermediate means arranged between said focusing operating means and said barrel means;
   (g) said intermediate means and said rotary member each having a first guide portion extending in an axial direction and a second guide portion extending at an inclined angle respectively wherein an engagement member of said holding means engages in the cross point of said first and said second guide portions, whereby when said focusing operating means is actuated, said holding means moves guided by a guide portion of inclined angle for manual focusing, and when said rotary member is actuated said holding means moves guided by a guide portion of inclined angle for automatic focusing.

7. A zoom lens mounting comprising:
(a) a first lens holding for containing a first lens capable of focusing and zooming functions;
(b) a second lens holder for containing a second lens for compensating for aberration due to change of mangification power;
(c) a rotatable member operating on the basis of a signal from object distance detecting means;
(d) barrel means having a longitudinal groove;
(e) a first cam member having a guide cooperative with said longitudinal groove of said barrel means to axially move said second lens holder;
(g) connecting means for connecting said first and said second cam members;
(h) a zoom actuation member connected to said first or said second cam member; and
(i) means for converting rotative movement of said rotatable member to axial movement of said first cam member,
whereby when in the automatic focusing mode, said first lens holder is moved to an in-focus position by rotation of said rotatable member, and when in a zooming mode, said first and said second lens holders are moved by rotating said zoom actuation member through said first and said second cam members.

8. A zoom lens mounting comprising:
(a) a focusing actuation member;
(b) first lens holding means for holding a first lens capable of focusing and zooming functions;
(c) second lens holding means for holding a second lens for compensating aberrations due to change in magnification power;
(d) a rotatable member operating on the basis of a signal from object distance detecting means;
(e) a zoom actuation member;
(f) first and second cam members for converting rotative movement of said zoom actuation member to adjustment of the separation between said first and said second lenses;
(g) means connecting said rotatable member with said first cam member; and
(h) means for holding said focus actuation member stationary, said holding-stationary means being responsive to setting of said focusing actuation member in the automatic focusing mode for holding said focusing actuation member stationary.

9. A mechanical mounting for a zoom objective according to claim 8 wherein:
(a) said first lens holding means comprises an outer holding member connecting with said first cam member and an inner holding member fixedly carrying said optical elements, said outer holding member and said inner holding member engaging with each other to be relatively rotatable by helicoid means, and said inner holding member being connected to said manual focusing operating means so that said optical elements are moved axially by said manual focusing operating means to effect focusing.

10. A mechanical mounting for a zoom objective, comprising:
(a) optical elements for focusing operative also to effect change in image magnification;
(b) holding means for holding said optical elements, said holding means comprising first holding means and second holding means, said first and said second holding means being arranged to be relatively movable by helicoid means;
(c) manual focusing operating means;
(d) a fixed barrel;
(e) zooming operating means;
(f) a rotary member rotating about the optical axis based on a signal from means for detecting the object distance;
(g) an intermediate member arranged upon actuation of said zooming operating member to rotate and upon actuation of said manual focusing operating means to move axially, said intermediate member having first connecting means for connection with said zooming operating means and second connecting means for connection with said manual focusing operating means;
(h) third connecting means connecting said intermediate member with said first holding means through said fixed barrel to axially move said optical elements along with said first holding means in response to movement of said intermediate member; and
(i) fourth connecting means connecting said rotary member with said second holding means so that when in the automatic focusing mode, said second holding means while rotating is axially moved by rotation of said rotary member, thereby to move said optical elements while rotating.

11. A mechanical mounting for an objective lens, comprising:
(a) optical elements arranged upon manual focusing operation to move axially and upon automatic focusing operation to move axially while rotating;
(b) first holding means for holding said optical elements;
(c) second holding means threadedly engaging with said first holding means;
(d) manual focusing operating means;
(e) a rotary member operating by a signal from object distance detecting means;
(f) first connecting means for connecting said first holding menas and said rotary member to move said optical elements axially while rotating when in the automatic focusing mode;
(g) an intermediate member arranged upon rotation of said manual focusing operating means to move axially; and
(h) second connecting means for connecting said intermediate member and said first holding means to move said optical elements axially when in the manual focusing mode.

* * * * *